March 4, 1969 — J. L. LASS ET AL — 3,431,170

NUCLEAR REACTOR FUEL BUNDLE

Filed Dec. 7, 1966

INVENTORS
James L. Lass
Dominic A. Venier
BY Charles B. Curry

INVENTORS
James L. Lass
Dominic A. Venier
BY
Charles D. E. Curry

INVENTORS
James L. Lass
Dominic A. Venier

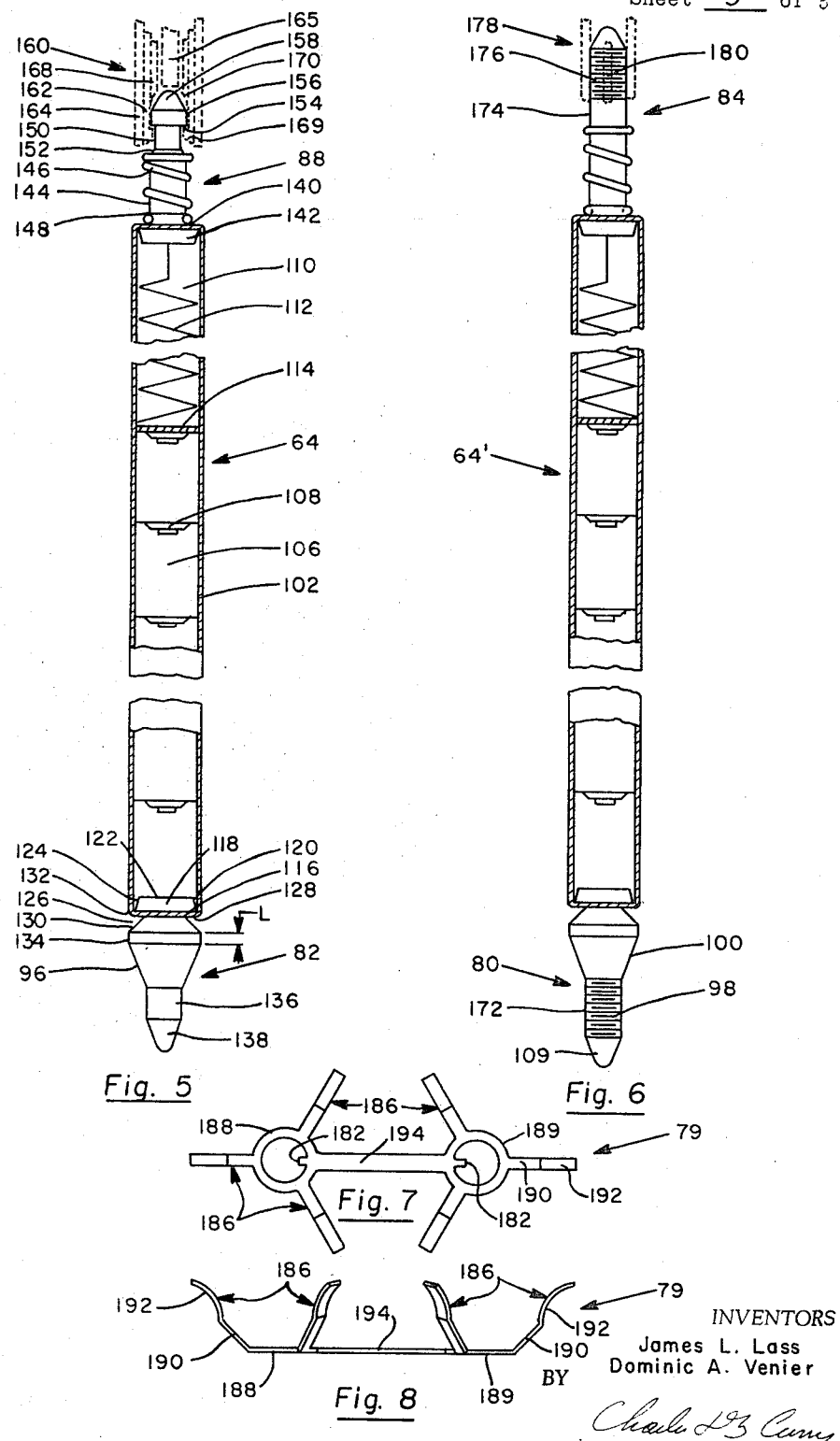

United States Patent Office 3,431,170
Patented Mar. 4, 1969

3,431,170
NUCLEAR REACTOR FUEL BUNDLE
James L. Lass and Dominic A. Venier, San Jose, Calif., assignors to General Electric Company, a corporation of New York
Filed Dec. 7, 1966, Ser. No. 599,865
U.S. Cl. 176—78         7 Claims
Int. Cl. G21c 3/32, 3/10

ABSTRACT OF THE DISCLOSURE

This describes a fuel bundle for a nuclear reactor comprising a plurality of fuel rods positioned between upper and lower tie plates, the upper tie plate being readily removable to permit ready interchange of the fuel rods.

---

The present invention relates broadly to an improvement in nuclear fission reactors and more particularly to a fuel bundle for use with such nuclear fission reactors.

The release of large amounts of energy through nuclear fission reactions is now quite well known. In general, a fissile (fissionable) atom such as $U^{233}$, $U^{235}$, $Pu^{239}$, or $Pu_{241}$ absorbs a neutron in its nucleus and undergoes a nuclear disintegration. This produces on the average two fission products of lower atomic weight with great kinetic energy, and several neutrons also of high energy. For example, the fission of $U^{235}$ produces a light fission product and a heavy fission product with atomic mass numbers ranging between 80 and 110 and between 125 and 155 respectively, and an average of 2.5 neutrons. The energy release approaches 200 mev. (million electron volts) per fission.

The kinetic energy of the fission products is quickly dissipated as heat in the nuclear fuel. If after this heat generation there is at least one net neutron remaining which induces a subsequent fission, the fission reaction becomes self-sustaining and the heat generation is continuous. The heat is removed by passing a coolant through heat exchange relationship with the fuel. The reaction may be continued as long as sufficient fissile material exists in the fuel to override the effects of the fission products and other neutron absorbers such as fission regulating control rods which also may be present.

In order to maintain such fission reactions at a rate sufficient to generate useful quantities of thermal energy, nuclear reactors are presently being designed, constructed, and operated in which the fissile material (nuclear fuel) is contained in the fuel elements which may have various shapes, such as plates, tubes or rods. For convenience these fuel elements will hereinafter be referred to as fuel rods. These fuel rods are usually provided on their external surfaces with a corrosion-resistant non-reactive cladding which contains no fissile or fertile material. The fuel rods are grouped together at fixed distances from each other in a coolant flow channel or region as a fuel bundle, and a sufficient number of these fuel bundles are combined to form the nuclear reactor core capable of the self-sustained fission reaction referred to above. The core is usually enclosed within a reactor vessel.

In general, nuclear reactor power plants are designed for perodic shutdown to refuel the reactor core. This is referred to as "reloading" the reactor and is performed by replacing part or all of the irradiated fuel with unused reload fuel. Typically, the reload schedule is arranged for reactor shutdown during those periods when power demands on the overall power grid are at a minimum. The scheduled reload may typically require that 20 to 25% of the irradiated fuel be removed from the reactor core and replaced with reload fuel. Therefore, for 25% annual reloads, there will be four reload shutdowns resulting in a complete replacement of the original fuel at the end of four years of normal operation.

The nuclear design of the reload fuel is fixed many months (12 months is not unusual) before loading the reload fuel into the reactor. The major portion of this lead time is required for nuclear design, manufacturing, testing and delivery of the reload fuel. It is very important to note that the nuclear design of the reload fuel is based on the condition of the reactor that is predicted to exist at the date of the scheduled reload. The basic conditions which must be considered in designing the reload fuel are: (1) the reactivity condition of the reactor core and remaining fuel, (2) the design lifetime and reactivity of the reload fuel, (3) the control rod strength (the neutron absorption effectiveness of the control rod), and (4) the desired shutdown margin (the control rod system strength over and above that required to shut down the reactor).

Since the reload fuel is designed many months in advance, there is a substantial likelihood that the nuclear design will not strictly meet the needs of the reactor at the time of reactor shutdown if unexpected deviations from originally predicted conditions occur. Such deviations may result, for example, from operations at power levels above or below that assumed for the period. From an economic operation standpoint, it would be very desirable to change the characteristics of the reload fuel to accommodate these deviations in order that the reload fuel meet the needs of the reactor as closely as possible. Once the reload fuel has been manufactured to a design correct for the assumed reactor conditions, there have been available prior to the present invention, only very limited and laborious techniques for changing the nuclear characteristics of reload fuel to accommodate the deviations from the assumed conditions so as to meet the needs of the reactor actually encountered at the time of shutdown for refueling. In such situations the time and expense required to alter the reload fuel bundles may be such as to require the use of the unmodified reload fuel under inefficient conditions. It may also require the unplanned exchange of control rods to increase or decrease their reactivity worth, or it may require the rearranging of fuel bundles in the core, or both. These situations can often require excessive expenditures of money, extended shutdown of the reactor power plant or other inconveniences which are detrimental to the economic and efficient operation of a nuclear reactor power plant.

In addition, past experience has required the removal of irradiated fuel bundles from the reactor prior to the completion of their scheduled exposure period. This unscheduled removal may be due to such factors as mechanical failure of one or more of the fuel rods in the fuel bundles or unexpected changes in the physics characteristics or requirements of the fuel bundle or reactor core. It has been general practice in these situations to scrap the fuel bundle since it is radioactive and cannot be readily modified or repaired.

The principal object of the present invention is to overcome these problems by providing a fuel bundle which may be readily repaired or modified while the fuel bundle is in the reactor core or when it is in a separate containment such as a water pool adjacent the reactor vessel.

Briefly, the present invention comprises a fuel bundle having an easily removable upper tie plate and a plurality of easily removable fuel rods which may be removed or inserted after removal of the upper tie plate. This is achieved by employing specially designed upper and lower fuel rod end plugs and a removable locking mechanism for the upper tie plate. The lower end plugs are shaped to permit insertion and withdrawal of the fuel rod without binding or catching on the fuel bundle spacers. This is achieved by the unique cooperation between a selfcentering cylindrical surface area and specially formed conical surfaces. The upper end plugs are shaped to receive detachable tooling which may be attached thereto to raise or lower the fuel rods. The locking mechanism is provided to lock the tie plate holding nuts in place by locking tabs that are readily unlocked by tooling that separate the tabs from the tie plate holding nuts.

The subject matter which is regarded as the invention is particularly pointed out and distinctly claimed in the concluding portion of the specification. The invention, however, both as to its organization and operation, together with further objects and advantages thereof, may best be understood by reference to the following description taken in conjunction with the accompanying drawings in which:

FIGURE 5 is an enlarged view in partial section of one type of removable fuel rod of the fuel bundle of the present invention;

FIGURE 6 is an enlarged view in partial section of another type of removable fuel rod of the fuel bundle of the present invention;

FIGURE 7 is an enlarged top view of the locking mechanism for use with the removable tie rod best shown in FIGURES 3 and 4;

FIGURE 8 is a side view of the locking mechanism shown in FIGURE 7.

Figure 1:
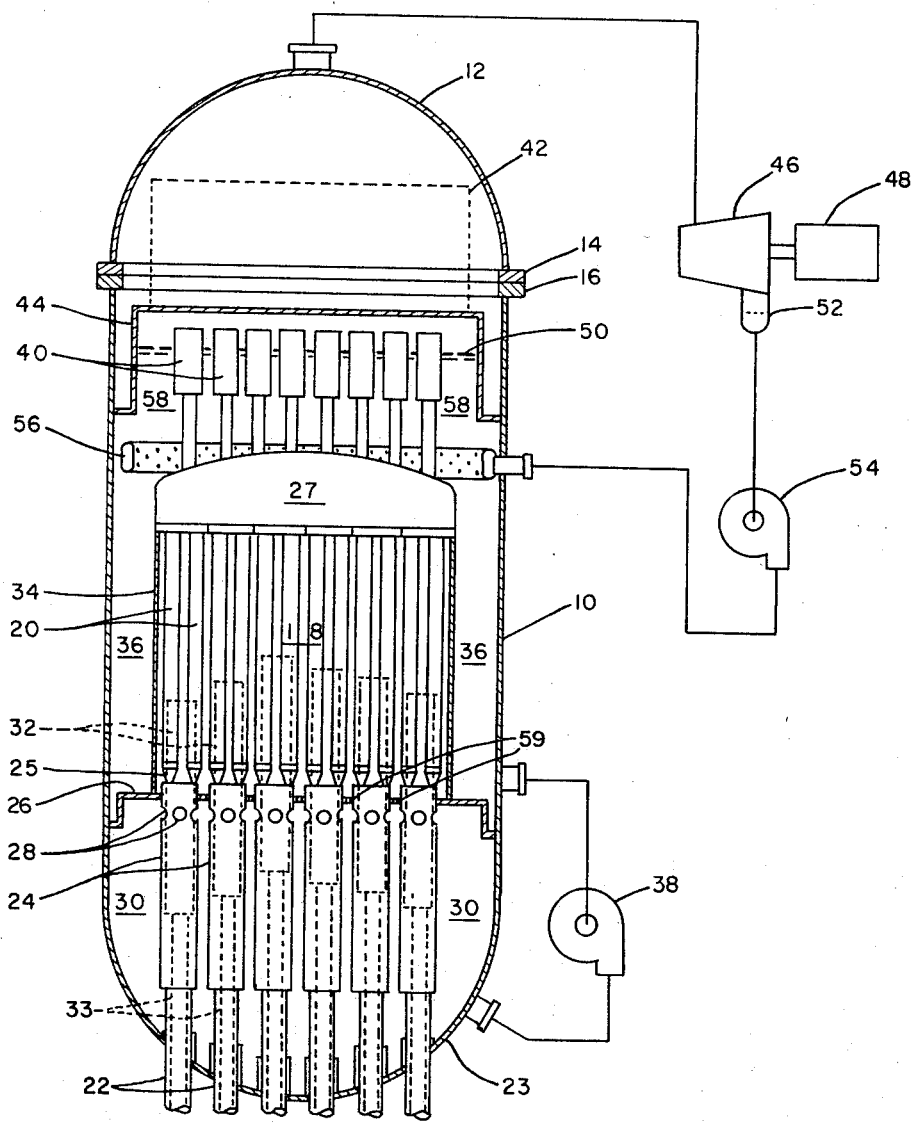
FIGURE 1 is a schematic flow diagram of a typical nuclear reactor power plant showing the reactor vessel in partial cross section and in which the fuel bundle of the present invention may be employed.

In FIGURE 1 is schematically illustrated a typical nuclear reactor power plant flow diagram in which the fuel bundle of the present invention may be employed. It is to be understood that the teachings of the present invention may be used with many different types of nuclear reactor power plants such as non-boiling water moderator-coolant types, the heavy water and graphite moderated types, organic moderated types, or types that employ sodium or other fluids as moderator-coolants. However, it is described here as used in a boiling water reactor since it has been found particularly useful with this type plant.

The reactor system depicted in FIGURE 1 includes reactor pressure vessel 10 provided with removable head 12 which is secured by means of flanges 14 and 16. Disposed within pressure vessel 10 is a nuclear chain reacting core 18 which includes a plurality of vertically positioned nuclear fuel bundles 20. Each fuel bundle consists of a plurality of longitudinally extending fuel rods which are positioned in spaced relation by spacers and top and bottom tie plates which have openings to permit moderator-coolant flow. Each bundle is provided with an open ended flow channel that surrounds the fuel rods.

A plurality of control rod drive thimbles 22 are sealed and connected to bottom head 23 of the reactor vessel by welding or the like. A plurality of longitudinally extending control rod guide tubes 24 have their lower ends secured to and are vertically and laterally supported by the upper ends of drive thimbles 22. The upper ends of control rod guide tubes 24 are laterally supported by bottom grid plate 26. The upper end of each control rod guide tube is provided with four sockets (not shown) and a cruciform-shaped opening (not shown). Four fuel bundles 20 are supported by each control rod guide tube 24, the lower tie plate 25 of each bundle being mounted in one of the four sockets. Each control rod guide tube is provided with openings 28, located near the upper end, that communicate with supply chamber 30 and with the sockets and the lower tie plates of the associated fuel bundles.

Control rods 32 (shown in dotted lines) control the overall power level, as well as the local power distribution of the reactor. A cruciform-shaped control rod is located in each control rod guide tube and is adapted to extend through the cruciform-shaped opening and to be moved vertically between the four associated fuel bundles 20 resting on the guide tube. The control rods are moved into and out of the reactor core by control rod drive shafts 33 (shown in dotted lines) which extend into respective control rod drive thimbles 22. The control rod drive shafts are selectively operated by individual drive mechanisms (not shown) which control the positions of the control rods in the reactor core. Detailed descriptions of drive mechanisms which may be used to drive the above described control rods are set forth in United States Patent 3,020,887, by Robert R. Hobson et al., issued Feb. 13, 1962.

A shroud 34 is mounted coaxially within the vessel to provide a downcomer annulus 36 between the shroud and the vessel wall. Recirculation water is continuously removed from the bottom of downcomer annulus 36 by pump 38 and introduced to supply chamber 30.

In the operation of a typical boiling water reactor a steam-water mixture generated in core 18, is discharged into plenum 27 from which the mixture flows upward into steam separators 40. Here the steam is separated from most of the water. The separated steam flows upward to steam dryer 42, mounted on annular support member 44, which removes the remaining water. The dry steam leaving the dryer is then transmitted to turbine 46 which drives electric generator 48. Water discharged from separators 40 and dryer 42 flows downwardly and radially outward across the top of plenum 27 and between the separators toward downcomer annulus 36. Broken line 50 illustrates the water level.

Exhaust steam from turbine 46 is condensed and collected in the condenser hotwell 52. Steam condensate is removed from the hotwell by pump 54, and is pumped as feedwater to annular sparger 56 thus mixing the feedwater with the water flowing from separators 40 and steam dryers 42. Thus, recirculation water flow is upward from supply chamber 30 successively through fuel bundles 20, plenum 27, steam separators 40, upper chamber 58, downcomer 36, and back into the inlet of the recirculation pump 38. It will be appreciated that recirculation pumping may be also performed by jet pumps placed in downcomer 36.

The water flowing from supply chamber 30 is divided into two parallel streams.

The first stream, consisting of about 90% of the total flow from supply chamber 30, passes successively through openings 28 at the top of the control rod guide tubes 24, the lower tie plates 25 of the fuel bundles, into and through the flow channels of the fuel bundles, through the upper tie plates of the fuel bundles, and into plenum 27. Within the flow channels, the water stream serves as a moderator-coolant for the fuel rods and in the process is partially vaporized to form a steam-water mixture.

The second stream, commonly referred to as the bypass leakage flow and conissting of the remaining 10% of the water flow from supply chamber 30, passes through annular openings 59 formed between the exterior surfaces at the upper ends of control rod guide tubes 24 and the associated openings in bottom grid plate 26. This water flows upward through the spaces formed between the outside of the nuclear fuel bundle flow channels and the control rods 32 and discharges into plenum 27 through spaces formed between the upper ends of the fuel bundle channels. This water serves to cool the control rods and fuel bundle channels to prevent the formation of steam in this region. This water also contributes to the neutron moderator effect of water flowing within the flow channels. The quality of the steam-water mixture resulting from combining the first and second streams in plenum 27 is typically about 10%.

Figure 2:
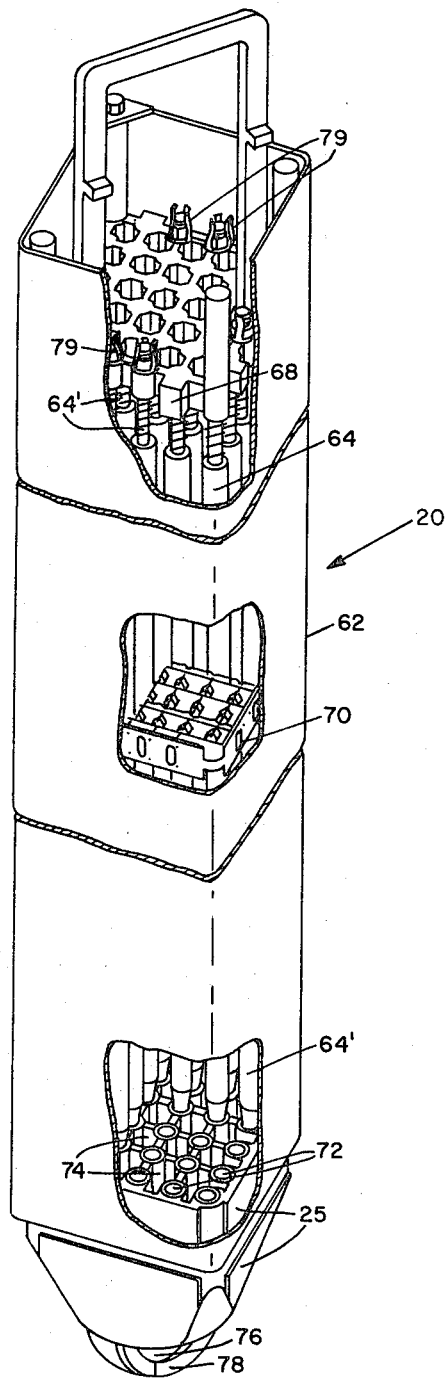
FIGURE 2 is an isometric view, in partial cross section of the fuel bundle of the present invention.

In FIGURE 2 is illustrated the removable rod fuel bundle of the present invention. Fuel bundle 20 generally consists of open ended tubular channel 62, fuel rods 64, lower tie plate 25, upper tie plate 68, and fuel rod spacer devices 70. Fuel rods 64 extend through and are supported in spaced relation by a plurality of fuel element spacer devices 70 which rest against the interior surface of tubular channel 62. These fuel rod spacer devices are separated from one another a predetermined distance along the bundle, for example, one and one-half feet, and are connected to one or more of the fuel rods to prevent longitudinal movement. This connection may be achieved by various means such as the attachment of locking devices to the fuel rod at these same predetermined distances.

Each fuel rod 64 comprises an elongated tube containing a fissile fuel material such as enriched uranium dioxide (UO₂). The fuel material is typically in the form of high density pellets placed end to end in the tube; however, it may be in the form of a compacted mass of high density powder or particles. Each end of the tube is sealed to prevent the coolant from contacting the fuel and to prevent fission products from escaping the fuel rod.

The lower ends of the fuel rods are supported by lower tie plate 25 and register with receptacles 72 which are formed in the lower tie plate. Openings 74 are positioned adjacent these receptacles and communicate directly with lower opening 76. The lower end of tubular channel 62 fits down around the upper end of the tie plate. The lower end of the tie plate is a tapered transition fixture terminating in an open nose-piece 78 of circular cross section and, when mounted in the reactor, rests in one of the sockets located at the top of a control rod guide tube 24 of FIGURE 1. When the fuel bundle is mounted in the reactor, lower opening 76 communicates with supply chamber 30 of FIGURE 1.

Figure 3:
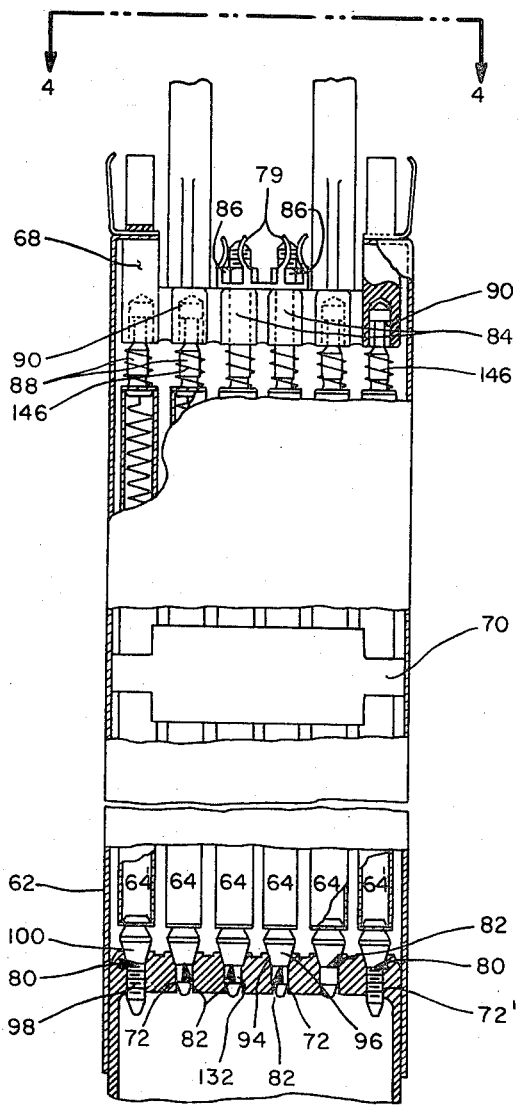
FIGURE 3 is an enlarged cross section view of the fuel bundle of the present invention.
Figure 4:
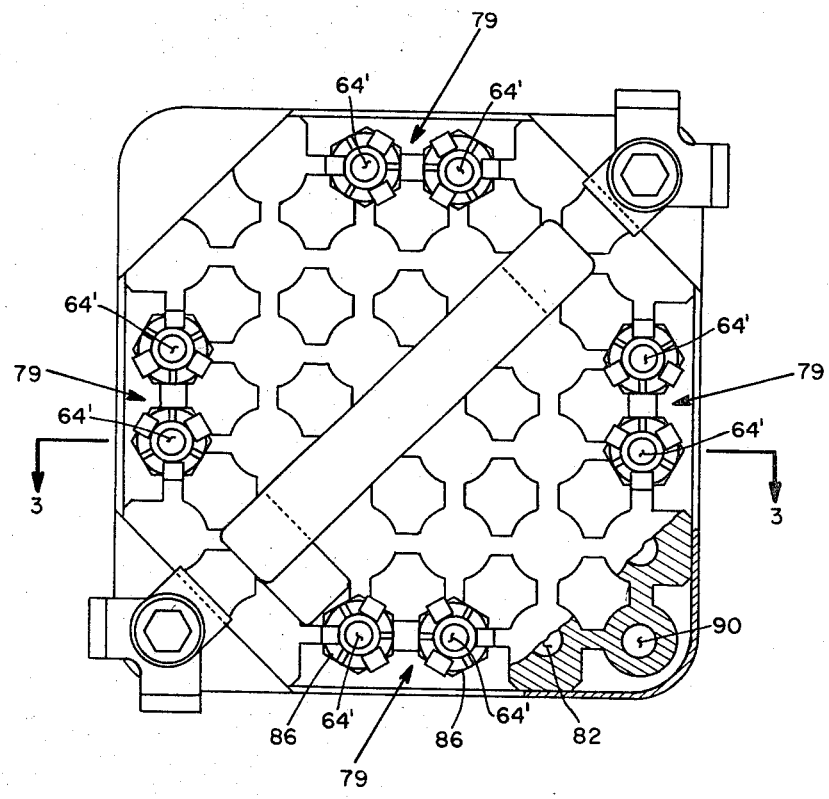
FIGURE 4 is a top view of the removable rod fuel bundle taken at section 4—4 of FIGURE 3.

Referring now to FIGURES 3 through 8 are illustrated the various features of the removable upper tie plate and the removable fuel rods of the fuel bundle of the present invention. As shown in FIGURES 3 and 4, removable upper tie plate 68 of the fuel bundle of the present invention includes four locking mechanisms 79 (the details of which are shown in FIGURES 7 and 8). Each of these locking mechanisms is operatively connected to two tie fuel rods 64'. In addition, the fuel bundle of the present invention includes two basic types of removable fuel rods. These are (1) removable tie fuel rods 64' (see FIGURE 6) and (2) removable fuel rods 64 (see FIGURE 5). The upper and lower tie plates are held together by the removable tie fuel rods 64', and removable fuel rods 64 are supported between the upper and lower tie plates. All of the fuel rods are provided with lower end plugs, the details of which will be hereinafter described, that are shaped to permit insertion and withdrawal of the fuel rods without binding or catching on fuel rod spacers 70. The lower end plugs 80 of tie fuel rods 64' are threaded whereas lower end plugs 82 of fuel rods 64 are not. In addition, the upper end of upper end plugs 84 of tie fuel rod 64' are shaped to receive removable locking mechanism 79, holding nuts 86 and tooling for removal of these rods (not shown). The upper end plugs 88 of fuel rods 64 are shaped to fit within openings 90 provided in the upper tie plate and to receive tooling for removal of these rods.

More specifically, the lower end plugs 82 of fuel rods 64 are supported by and register with receptacles 72. The upper end of each of receptacles 72 has a conical surface 94 at the inner side of the lower tie plate to receive conical section 96 of lower end plug 82. Lower end plugs 80 of the tie fuel rods 64' have threads 98 that register with internally threaded receptacles 72'. Receptacles 72' are also conically shaped at the inner side of the lower tie plate to receive conical sections 100 of lower end plugs 80 of tie fuel rods 64'.

In FIGURES 5 and 6 respectively illustrated fuel rod 64 and tie fuel rod 64' which were previously described in connection with the fuel bundle of FIGURES 2 through 4. Each of these rods along with the technique of locking the tie rods in the fuel bundles are the subject of the present invention.

Referring to FIGURE 5, fuel rod 64 includes an elongated cylindrical clad or tube 102 which may be made of many different materials, however, it is preferably made of zirconium, since this material has a low neutron capture cross section. The upper and lower ends of the fuel rod are respectively closed by means of upper end plug 88 and lower end plug 82, both which are preferably made of zirconium. These end plugs are respectively welded or fused to the opposite ends of tube 102 to prevent the reactor coolant from contacting the fuel and to prevent fission products from escaping the fuel rod. Disposed within tube 102 is a fuel material such as uranium dioxide which is in the form of pellets 106 which are placed end to end in the tube. These pellets may be provided with dished ends or free volumes 108 to allow for swelling of the pellets during operation within the nuclear reactor. Fuel rod 64 is also provided with a plenum chamber 110 which collects fission product gases given off by the nuclear fuel during operation in the nuclear reactor. The volume of the chamber is made large enough to accommodate at reasonable pressure fission product gases which are expected to be released by the fuel during its anticipated life cycle in the nuclear reactor. Plenum spring 112 is disposed in plenum chamber 110 and forces pellets 106 into facial contact with one another and typically exerts a force of about 5 pounds. This plenum spring is preferably made of Inconel-X steel or other material having suitable spring characteristics and preferably has a helical configuration with the outside diameter being less than the inside diameter of the tube. A flat circular wafer 114 is disposed between the bottom end of spring 112 and the upper end of uppermost pellet 106 to prevent fuel particles or chips from entering the plenum chamber and to distribute the load uniformly against the uppermost pellet.

From FIGURE 5 it can be seen that lower end plug 82 includes a cylindrical collar 116, having a diameter about equal to the outside diameter of tube 102, and inwardly extending end section 118. End section 118 is solid, has a conical external surface 120, and has a flat inner surface 122 against which the lower fuel pellet rests. A tapered annular volume 124 is formed between external surface 120 and the internal surface of tube 102. A circumferential slot 126 is formed between exterior surface 128 of cylindrical collar 116 and conical surface 130. Preferably, cylindrical collar 116 comprises part of the weld material. The welding operation will then consist of heating both collar 116 and the end tube 102 to a temperature that exceeds their melting points thereby fusing and forming a circular weld point 132. This circular weld joint is rounded and functions in the hereinafter described manner. A particularly important characteristic of end plug 82 is that it includes longitudinally extending cylindrical surface 134. The function of this surface will be described below. Extending downwardly from the lower edge of cylindrical surface 134 is conical section 96 which merges into cylindrical section 136 which merges into a bullet-shaped nose section 138.

The operation and function of lower end plug 82 will now be described in connection with the various figures of the drawings. Bullet-shaped nose section 138 provides a small smooth shape which is easily inserted into spacers 70 of FIGURES 2 and 3 and into receptacles 72 of lower tie plate 25. As best depicted in FIGURE 3 cylindrical section 136 has a diameter slightly less than the diameter of receptacle 72 so that it may be inserted therein. Conical section 96 cooperates with conical surface 94 of receptacles 72 to support the fuel rod in both the radial and longitudinal directions. The slope of the conical section also tends to align the fuel rod while being inserted into the fuel bundle.

A major problem encountered in providing an effective removable rod is that of preventing the rod from becoming mechanically attached to or bound by spacers 70 during either insertion or removal of the rod from the fuel bundle. This is particularly so when the spacer includes small mechanical members, such as grid wires or metal extensions, which may become engaged with circumferential slot 126 of the lower end plug as best depicted in FIGURE 5. Circumferential slot 126 is desirable since it functions to prevent excessive heat removal from collar 116 during the welding operation. It has been found that longitudinally extending cylindrical surface 134 aligns and attenuates lateral motion of the removable rod while being inserted through or withdrawn from the spacer cell so that small members of the spacer cell do not become engaged with circumferential slot 126. It has been found that the length L of cylindrical surface 134 is preferably about 0.1 inch. However, it is to be understood that the aligning and attenuating characteristics of cylindrical surface 134 will not be diminished and may be somewhat improved if the length L is increased. This is because the removable rod will have more time and distance to align and attenuate while being inserted into the spacer. However, if the length L is substantially decreased, the lateral motion of the end plug, while being inserted into the spacer, has a smaller probability of being diminished or attenuated since it will not come into contact with cylindrical surface 134. Therefore, the lateral motions or vibrations of the end plug while being inserted into the spacer may result in small members of the spacer becoming entrapped in circumferential slot 126. It should be noted that the rounded edge of circular weld joint 132 permits a small misalignment of the fuel rod during insertion since the rounded edge will align the fuel rod while being inserted through the spacer cell. In like manner, when the fuel rod is being withdrawn from the fuel bundle, tapered surface 130 will align any misalignments an lower end plug 82 will not bind in the spacer. In view of the foregoing it can be seen that a unique lower end plug 82 is provided that both allows for proper welding to tube 102 and permits ease of insertion and withdrawal of the rod in the fuel bundle.

Upper end plug 88 is provided with cylindrical collar 140 and end section 142 that are shaped and function in basically the same manner as collar 116 and end section 118 of lower end plug 82. A cylindrical section 144 extends upwardly from collar 140 and compression spring 146 surrounds section 144 and functions in the hereinafter described manner. It should be noted that a groove 148 is provided adjacent cylindrical collar 140 to capture the bottom turn of compression spring 146. It is important to capture compression spring 146 since it might otherwise loosen during rod handling operations and fall into the fuel bundle or reactor core. Slot 150 is provided near the upper end of top end plug 88 and is formed between conical surface 152 at the lower end and right angle annular surface 154 at the upper end. End plug 88 is also provided with a longitudinally extending cylindrical surface 156, having about the same diameter as cylindrical section 144, and bullet-shaped nose section 158.

Rod removal tooling 160 is generally illustrated by dotted lines and includes fingers 162 which are inwardly biased by the lower end of sleeve 164. Sleeve 164 is slideable longitudinally with respect to finger 162. In operation, sleeve 164 is withdrawn from fingers to permit their radial expansion. The fingers are then aligned with and inserted over bullet-shaped nose section 158 and over cylindrical surface 156 and into alignment with slot 150. Stop 165 contacts nose section 158 and is positioned to stop the inward movement of the fingers when they are aligned with slot 150. After fingers 162 are radially aligned with slot 150 sleeve 164 is inserted thereover to move them radially inward and into engagement with slot 150. By maintaining sleeve 164 in the fully inserted position, fingers 162 will not separate while the fuel rod is being removed or inserted. Fingers 162 may become disengaged from slot 150 by withdrawing sleeve 164 and inserting fingers 168 which cause radial expansion of fingers 162. Preferably, fingers 162 and 168 respectively include conical surfaces 169 and 170 to permit ease of insertion.

In FIGURE 6 is illustrated removable tie rod 64'. Many features of this fuel rod are the same as those of removable rod 64 and the common features will therefore not be described. Differences that exist are in lower end plug 80 and upper end plug 84. The basic difference in lower end plug 80 is that it includes threads 98 that are formed in cylindrical section 172. Cylindrical section 172 is made longer than the equivalent cylindrical section 136 of end plug 82 of removable rod 64. This increase in length of cylindrical section 172 is provided to assure that threads 98 are in complete engagement with the corresponding threads of receptacle 72 as best depicted in FIGURE 3.

Upper end plug 84 of the removable tie rod of FIGURE 6 differs from the removable rod of FIGURE 5 in that cylindrical section 174 extends throughout the entire length of the upper portion of the upper end plug. In addition, threads 176 are provided to receive holding nuts 86 as shown in FIGURES 2, 3 and 4. Furthermore, threads 176 receive corresponding threads from removable rod holding tooling 178 which is generally illustrated in dotted lines. Slot 180 is provided to receive extensions 182 of locking mechanism 79 as best depicted in FIGURE 7 which will be hereinafter described.

In FIGURES 7 and 8 are illustrated locking mechanism 79 of the removable rod fuel bundle of the present invention. Locking mechanism 79 includes locking members 186 that extend radially outward from rings 188 and 189 at 120° intervals. Each of locking members 186 has a straight section 190 and a curved section 192 which extend generally in the upward and outward directions from the plain surface of rings 188 and 189. Ringes 188 and 189 are interconnected by member 194 which prevents rotation of holding nuts 86 and removable tie rods 64'.

In operation, tie rods 64' are inserted through spacers 70 of FIGURES 2 and 3 and rotated into threaded receptacle 72' of lower tie plate 25 until conical section 100 of the end plug 80 engages the conical seat of receptacle 72' of the lower tie plate as best depicted in FIGURE 3.

The tie rods are then rotated until slots 180 of the upper end plugs 84 of adjacent tie rods face each other. Then, the remaining fuel rods 64 are inserted through the spacers and into engagement with the lower tie plate. Next, the upper tie plate is inserted over the fuel rods and a relatively small bias of about five pounds is exerted against the compression springs 146 of the installed rods as best depicted in FIGURE 3. Locking mechanisms 79 are inserted over the ends of each of the adjacent pairs of tie rods 64' such that extensions 182 of each of rings 188 and 189 engage the respective facing slots 180 of the tie rods. After this operation has been completed, holding nuts 86 are rotated on threads 176 and into engagement with the upper surface of rings 188 and 189 of the locking mechanisms. Members 186 are then forced in the inward direction until straight sections 190 are engaged with the flat wire sections of holding nuts 86. It can be seen that member 194 is prevented from rotating since it is operatively connected to adjacent tie rods by rings 188 and 189 and each adjacent tie rod is prevented from rotating about the other since the tie rods are prevented from moving in lateral directions by the tie plates. Since member 194 is stationary, it prevents rings 188 and 189 from rotating and extensions 182, which cooperate with slots 180 of the adjacent tie rods, prevent the adjacent tie rods from rotating out of receptacle 72' of the lower tie plate. Holding nuts 86 are prevented from rotating by members 186 which are prevented from rotating since they are integral with locking mechanism 79. In this manner all elements of the fuel bundle are securely locked in their proper positions and will not become unlocked during handling or when operated in the nuclear reactor.

The fuel bundle may be disassembled or removable rods may be removed and replaced in the following manner. First, a tool, not shown, is inserted between curved sections 192 which forces them outwards. Then, using either the same tool or a separate tool, holding nuts 86 are removed. Then locking mechanisms 79 are lifted and removed from the adjacent tie rods. Upper tie plate 68 is then removed thereby exposing removable rods 64 and removable tie rods 64'. The individual removable rods and removable tie rods can now be removed and replaced with the tooling as previously described. The fuel bundle is reassembled by the reverse sequence of operations.

It will be appreciated that various modifications of the present invention may be made by those skilled in the art. For example, the particular shape of the lower and upper end plugs and the locking mechanism may be modified to meet particular needs. For example, different shaped slots may be used to accommodate different tooling. In addition, a greater or lesser number of members 186 of locking member 79 may be employed, or their particular angles and relative lengths may be varied to accommodate particular needs. Also, individual locking mechanisms for each tie rod may be employed wherein the locking mechanisms would be prevents from rotating by, for example, having one or more extensions from ring 188 extend downward and engage the lower tie plate.

Various embodiments of this invention have been described and it should be understood that various other modifications and adaptations thereof may be made by those skilled in this particular art without departing from the spirit and scope of this invention as set forth in the following claims.

We claim:

1. A fuel bundle for a nuclear reactor comprising a plurality of rods, at least one of said rods containing nuclear fuel, first and second tie plates positioned at respective ends of said bundle to retain said rods in a predetermined geometric array, at least one pair of said rods being interconnected by a locking device for preventing the rods of said pair from rotating, and means for holding said tie plates to said pair of rods, said locking device comprising interconnected first and second rings, said first ring surrounding one rod of said pair of rods and having a radially inwardly directed extension engaging said opening of said one rod, and said second ring surrounding said other rod of said pair of rods and having a radially inwardly directed extension for engaging said opening of said other rod.

2. The fuel bundle of claim 1 wherein said locking device interconnects adjacent ends of the rods of said pair of rods, wherein said ends are adapted to receive holding nuts, and wherein each said rings includes an extension for engaging and retaining said nuts.

3. A fuel bundle for a nuclear reactor comprising a plurality of fuel rods each containing a nuclear fuel, first and second tie plates positioned at respective ends of said bundle to retain said fuel rods in a predetermined geometric array, each of said fuel rods being formed with a first end plug engaging said first tie plate and a second end plug engaging said second tie plate, the first and second end plugs of at least one of said fuel rods being provided with holding means for securing said tie plates thereto, the holding means securing said first end plug to said first tie plate being releasable for removal of said first tie plate wherein each fuel rod of at least a pair of said fuel rods is provided with holding means for securing said tie plates to said pair of fuel rods, and a locking device interconnecting said pair of fuel rods for preventing the fuel rods of said pair from rotating.

4. The fuel bundle of claim 3 wherein said second end plugs of said fuel rods of said pair of fuel rods are threaded into said second tie plate, wherein said releasable holding means comprises holding nuts threaded on said first end plugs and wherein said locking device comprises means for engaging and retaining said nuts.

5. The fuel bundle of claim 3 wherein said second end plug of each of said fuel rods is formed with a conical section engaging said second tie plate.

6. The fuel bundle of claim 5 wherein said second end plug is formed with a cylindrical surface extending from said conical section toward said fuel rod.

7. The fuel bundle of claim 5 wherein said second end plug is formed with a bullet-shaped nose section extending from said conical section.

References Cited

UNITED STATES PATENTS

| | | | |
|---|---|---|---|
| 2,905,338 | 9/1959 | Koch | 176—30 X |
| 3,057,793 | 10/1962 | Coates et al. | 176—30 X |
| 3,125,760 | 3/1964 | Foster et al. | 176—30 X |
| 3,134,722 | 5/1964 | Hespel et al. | 176—87 X |
| 3,164,530 | 1/1965 | Banks | 176—30 X |
| 3,205,144 | 9/1965 | Jabsen | 176—30 X |
| 3,338,791 | 8/1967 | Lass et al. | 176—66 |
| 3,128,235 | 4/1964 | Hackney et al. | 176—78 X |
| 3,331,749 | 7/1967 | Anthony et al. | 176—78 |

CARL D. QUARFORTH, *Primary Examiner.*

MELVIN J. SCOLNICK, *Assistant Examiner.*

U.S. Cl. X.R.

176—79, 66, 87